United States Patent [19]

Wallick, Jr. et al.

[11] Patent Number: 5,005,280

[45] Date of Patent: Apr. 9, 1991

[54] METHOD OF MANFACTURING A FOLDABLE LADDER STRUCTURE

[75] Inventors: Claude R. Wallick, Jr.; Thomas J. Schmitt, both of Louisville, Ky.

[73] Assignee: Emerson Electric Co., St. Louis, Mo.

[21] Appl. No.: 436,965

[22] Filed: Nov. 15, 1989

Related U.S. Application Data

[60] Continuation of Ser. No. 294,398, Jan. 9, 1989, which is a division of Ser. No. 3,613, Jan. 15, 1987, Pat. No. 4,834,216.

[51] Int. Cl.$^5$ .............................................. B29C 67/22

[52] U.S. Cl. ..................................... 29/434; 29/527.1; 264/41; 264/328.8

[58] Field of Search ...................... 29/434, 469, 525.1, 29/527.1; 264/41, 328.8

[56] References Cited

U.S. PATENT DOCUMENTS

| | | | |
|---|---|---|---|
| 3,331,899 | 7/1967 | Immel | 264/51 |
| 3,941,528 | 3/1976 | Cotterell | 264/51 |
| 4,029,172 | 6/1977 | Green | 182/46 |
| 4,201,360 | 5/1980 | Schwartzburg et al. | 264/318 |
| 4,318,213 | 3/1982 | Blount | 29/434 |
| 4,372,901 | 2/1983 | Kim | 264/46.7 |
| 4,424,180 | 1/1984 | Lalloz et al. | 264/51 |
| 4,482,306 | 11/1984 | Hahn | 264/51 |
| 4,722,821 | 2/1988 | Vermilye | 264/328.8 |
| 4,806,293 | 2/1989 | Akiyama et al. | 264/51 |
| 4,806,405 | 2/1989 | Liebl | 425/117 |

*Primary Examiner*—David A. Simmons
*Assistant Examiner*—Allan R. Kuhns
*Attorney, Agent, or Firm*—Polster, Polster and Lucchesi

[57] ABSTRACT

A method of making foldable ladder structure wherein plastic material is injected and expanded in molds to form several parts of a foldable ladder which includes front and rear ladder sections that can be pivotally hinged at their upper portions, a collapsible shelf and spreader linkage to allow the sections to be relatively pivoted from collapsed face-to-face relation to erected position.

7 Claims, 4 Drawing Sheets

METHOD OF MANFACTURING A FOLDABLE LADDER STRUCTURE

This is a continuation of copending application Ser. No. 294,398, filed Jan. 9, 1989, now abandoned. This is a divisional of copending application Ser. No. 003,613, filed on Jan. 15, 1987, now U.S. Pat. No. 4,834,216.

BACKGROUND OF THE INVENTION

The present invention relates to an improved foldable ladder structure and a method of manufacturing such foldable ladder structure and more particularly to a structure wherein at least one or more of several sections of a foldable ladder are formed from a shaped, integral and unitary structural material and to a method of forming such sections.

It is well known in the ladder art to make principal ladder sections of a complete ladder, such as the front step section and the rear back section, the support shelf and the spreader linkage from wood, aluminum, fiberglass or even plastic materials. It also is well known to assemble these several sections into a completed ladder wherein the sections can be moved relative to one another between a foldable or collapsed position wherein the front and rear sections are in adjacent face-to-face relation for transport and storage to an erected position wherein the lower portions of the front and rear sections are spaced apart with a spreader mechanism interposed between and connected to the front and rear sections serving to limit the spread or angle of opening and with a shelf connected to the upper part of one of the spread apart sections extended to support material thereon. The manufacture and assembly of the various and multiple parts of past ladders has been comparatively complex and difficult, requiring the separate cutting, sawing and finishing of numerous parts such as steps, braces, side rails, shelves, spreader arms, linkage mechanisms, hinges, wear treads, and trusses and gussets required to strengthen the several parts wherever needed. Further, the assembly of these numerous parts including but not limited to the steps of cutting, drilling, sanding, aligning, holding, bolting, nailing, gluing and otherwise fastening one part to another has been time and labor consuming, resulting in labor intensive products which have been comparatively expensive in manufacture and assembly, heavy for transport and bulky for storage.

One of several patents which illustrate past types of ladder structures is U.S. Pat. No. 821,391, issued to S. E. Wiltse on May 22, 1906, which broadly discloses hinged collapsible, erectable step members. In addition, a number of prior patents broadly suggest making one or more parts from plastic materials, such as can be seen in U.S. Pat. No. 3,042,140, issued to G. E. Basile et al on July 3, 1962; U.S. Pat. No. 3,744,591, issued to R. Lucci et al on July 10, 1973; U.S. Pat. No. 4,023,647, issued to R. C. Confer on May 17, 1977; U.S. Pat. No. 4,029,172, issued to A. Green on June 14, 1977; U.S. Pat. No. 4,124,093, issued to J. H. Breisch on Nov. 7, 1978; U.S. Pat. No. 4,193,476, issued to J. D. Emmons on Mar. 18, 1980; U.S. Pat. No. 4,215,766, issued to R. D. Littlefield et al on Aug. 5, 1980; and U.S. Pat. No. 4,244,760, issued to E. C. Smith on Jan. 13, 1981. As aforediscussed, the ladder structures as taught by these patents as well as other prior structures have been accompanied with undesirably complex and expensive manufacturing and assembly problems due to the number of parts involved and the number of assembly steps required.

The present invention (the novel designs for which are disclosed in copending design patent applications: Ser. No. D.710,479, filed Mar. 11, 1985; Ser. No. D.851,683, filed Apr. 14, 1986; and, Ser. No. D.852,500, filed Apr. 14, 1986) provides a unique ladder structure and a method of making the same which requires a minimum of sections to reduce manufacturing and assembly steps, which can be comparatively light in weight and compact for transport and storage but which is sturdy and of sufficient strength and stability to meet various industry standards and which is, at the same time, both electrically insulative and resistant to moisture and other weathering elements. The unique and novel apparatus and method of the present invention not only limits the number of parts required for efficient and economical manufacture but includes assembly features which allow for ready alignment and interchangeability and user features which allow for ready and sturdy erection, collapse, transport and storage, offering the required strength and stability with minimum wear and weather erosion.

Various other features of the present invention will become obvious to one skilled in the art upon reading the disclosure set forth herein.

SUMMARY OF THE INVENTION

More particularly, the present invention provides foldable ladder structure comprising: opposed front and rear ladder sections, each including a pair of spaced longitudinally extending side members with spaced cross-brace means connectively extending therebetween with the brace means of at least one section being in the form of a spaced top platform and steps extending normal to and connected to the spaced side members, at least one of the sections including at least a portion of the top platform being formed from a shaped, integral and unitary structural material; and, hinge means for pivotally connecting the front and rear ladder sections together at the upper portions thereof so that the sections can be pivoted relative each other from collapsed face-to-face relation to erected position with the upper portions in proximal relation and the lower portions in spaced distal relation. In addition, the present invention provides a novel, unitary and integral shelf section and a novel link arm structure for a spreader section. Further, the present invention provides a novel method for forming ladder sections for foldable ladder structure comprising the steps of: supply a controlled quantity of expansible plastic compound in unexpanded form along a partially confined first mold part of a mold pair, the first mold part of the pair having a preselected shape in accordance with the ladder section to be formed, the first mold part of the mold pair being confined with an opposing second and mating mold part of the pair also of preselected shape in accordance with the ladder section to be formed; expanding the compound to the limits of confinement of the mating pair of mold parts; and, releasing the finished ladder section from mold confinement after the expanded plastic compound has set.

It is to be understood that various changes can be made by one skilled in the art in the several parts of the apparatus disclosed herein and in the several steps of the method described herein without departing from the scope or spirit of the invention.

BRIEF DESCRIPTION OF THE DRAWINGS

Referring to the drawings which disclose an advantageous embodiment of the structure of the present invention and a schematic flow diagram of the inventive method.

DETAILED DESCRIPTION OF THE DRAWINGS

Figure 1:
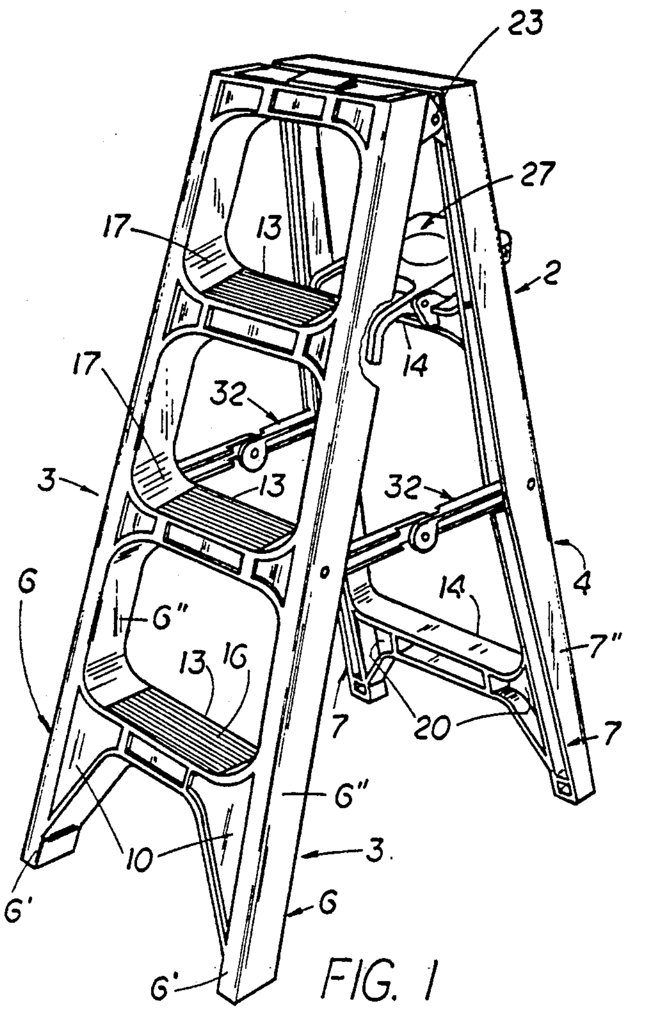
FIG. 1 is a front perspective view of the inventive foldable ladder in erected position, looking downwardly thereon.
Figure 3:
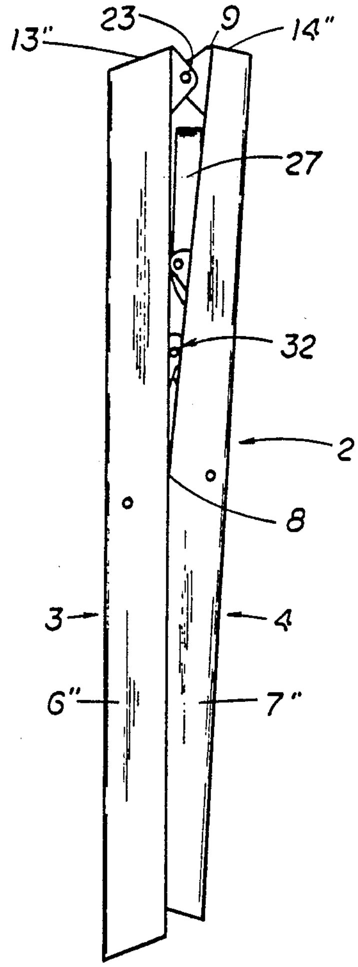
FIG. 3 is a right side elevational view of the foldable ladder in fully folded or collapsed position.
Figure 2:
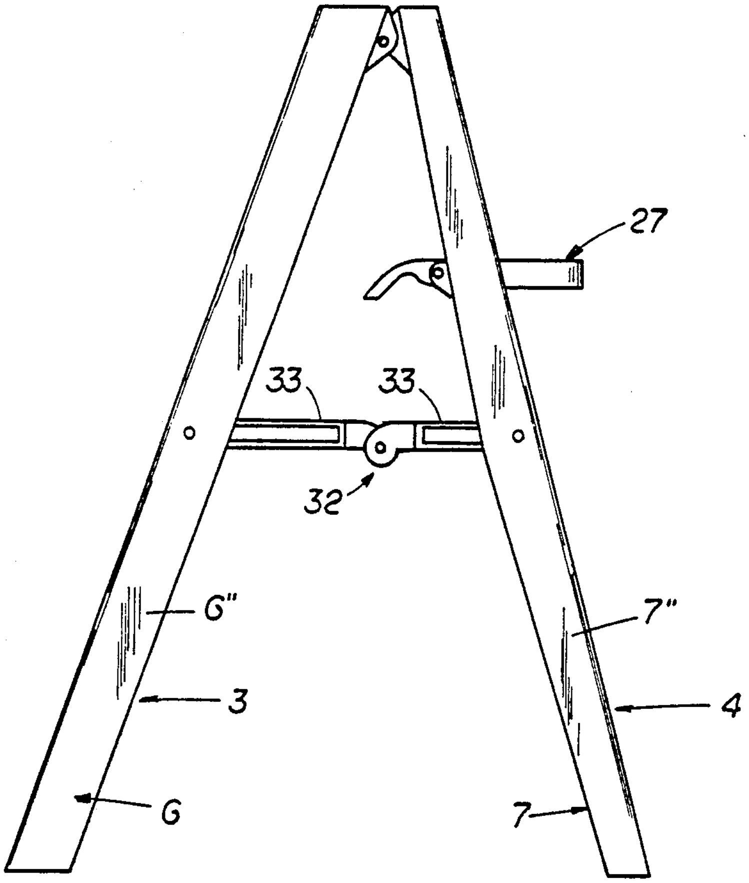
FIG. 2 is a right side elevational view of FIG. 1.

Referring to FIGS. 1-3 of the drawings, the novel foldable ladder structure broadly referred to by reference numeral 2, includes opposed front ladder section 3 and rear ladder section 4. Advantageously, each of the ladder sections as described hereinafter can be formed from a shaped, integral and unitary plastic structural material in accordance with a novel method also described hereinafter or, if so desired and, if expedient to do so, one or more of the sections can be formed in a different manner by a different method.

Figure 11:
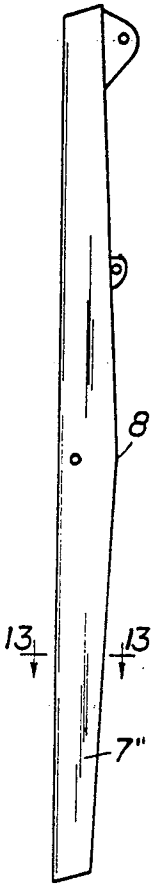
FIG. 11 is a right side elevational view of FIG. 10, the opposite side being a mirror image thereof.

Front and rear sections 3 and 4 as disclosed each include spaced opposed longitudinally extending side member pairs 6 and 7. As can be seen in the cross-sectional views of FIGS. 7 and 13, side members of pairs 6 and side members of pairs 7 respectively are each of substantially U-shaped cross-section throughout to provide longitudinally extending base legs 6′ and 7′ respectively, each having spaced opposed side legs 6″ and 7″ respectively extending therefrom with the opposed open ends of opposed U-shaped side members of opposed ladder sections 3 and 4 facing each other. It is to be noted in FIGS. 3 and 11 that the side legs 7″ of side members 7 of rear ladder section 4 are each of tapered breadth with the greatest breadth of the side leg 7″ as at point 8 being substantially in the middle and intermediate the extremities of the side leg 7″. This feature serves to strengthen the side members 7 and to permit preselected face-to-face collapsing of opposed ladder sections 3 and 4 for compact transport and storage of the folded ladder 2. This feature further serves to space the upper platform sections when the platform is in collapsed position for carrying and storage and to avoid finger pinching during ladder erection It is further to be noted in FIGS. 6 and 12 that both U-shaped side members 6 of the side member pair of front ladder section 3 and U-shaped side member 7 of the side member pair of rear ladder section 4 are provided with spaced sets of truss member 11 and 12 respectively. The truss members of these sets extend transversely between the opposed legs of each side member for additional structural strength and, as will be discussed more fully hereinafter, the middle truss members of each set also are used as stop members. Also, it is to be noted in FIGS. 1, 4, 6, 10 and 12, that suitable bracing struts 10 and 20 can be provided at the base of the side members of each ladder section 3 and 4 respectively to strengthen base support of the ladder sections.

As can be seen in FIGS. 1, 4 and 6 and FIGS. 10 and 12, the opposed front and rear ladder sections 3 and 4 each include a set of spaced cross-braces 13 and 14 respectively of generally U-shaped cross-section connectively extending longitudinally between and normal to the inner legs of the pairs of U-shaped side members 6 and 7 respectively. The cross-braces 13, each of which includes longitudinally extending outside facing base leg 13′ and integral, inwardly extending spaced side legs 13″ (as disclosed in FIG. 16) are in the form of spaced steps (FIG. 4) with the upper faces of the upper side legs 13″ thereof so positioned relative the spaced pair of side members 6 as to be horizontally oriented when foldable ladder 2 is in erected position. In this regard, it is to be noted that the lengths of the spaced sets of cross-brace members 13 and 14 increase from top toward bottom of the ladder sections so that side members 6 and 7 taper outwardly from top toward bottom, the amount of tapering and spacing conforming with existing ladder code requirements. It also is to be noted in FIG. 17 that the generally U-shaped cross-brace members 14 of the rear ladder section, each of which is disclosed to include longitudinally extending outside facing base leg 14′ and integrally inwardly extending spaced side legs 14", could be, if desired, formed in a manner similar to cross-brace members 13 to provide upper step portions.

Figure 4:
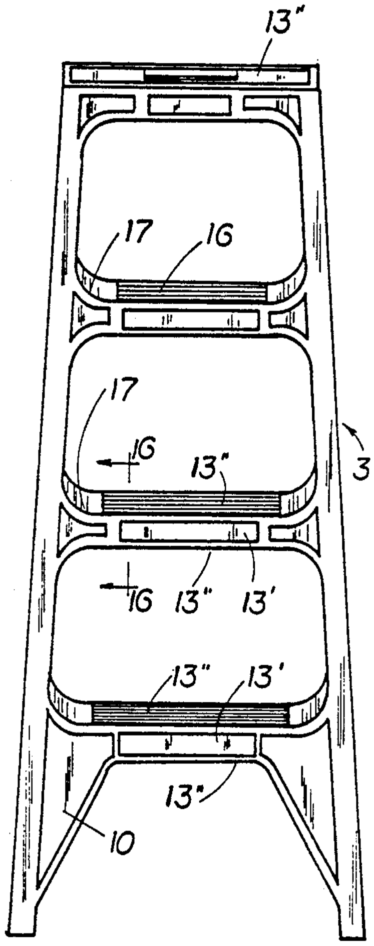
FIG. 4 is an outside or front elevations view of the front section of the foldable ladder.
Figure 5:
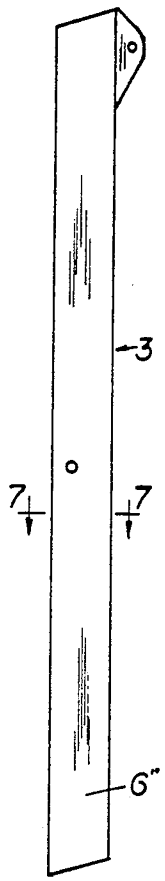
FIG. 5 is a right side elevational view of FIG. 4, the opposite side being a mirror image thereof.
Figure 16:
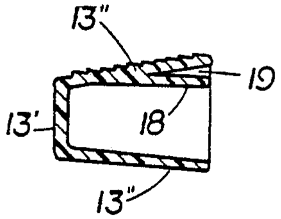
FIG. 16 is an enlarged cross-sectional view taking in a plane through line 16—16 of FIG. 4, disclosing details of one of the generally U-shaped cross-braces serving as steps in the ladder front section including the tread and the reinforced upper leg portion of such a step.
Figure 17:
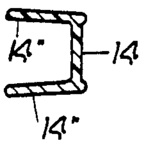
FIG. 17 is an enlarged cross-sectional view taken in a plane through line 17—17 of FIG. 12, disclosing details of the generally U-shaped cross-brace of the ladder rear section.

In this regard, referring to FIGS. 4 and 16, it can be seen that the upper side legs 13' have a tread surface thereon of spaced, longitudinally extending serrations 16 of triangular cross-section to define a relatively sharp gripping edge at the upper portion thereof. In the embodiment disclosed, it is to be noted that one side of each serration slopes inwardly downward from front to back relative the step face and that the other side of each serration is normal to the step face. It also is to be noted that each of the U-shaped brace members 13 and 14 have the spaced side legs thereof tapering slightly outward from the respective base legs. The reasons for such contour of serrations and the tapering of brace members will be discussed more fully hereinafter. Further, in FIGS. 1, 4 and 6, it is to be noted that the upper side legs 13" of each cross-brace member 13 that serves as a step is curved upwardly at the longitudinal extremities thereof as indicated by reference numeral 17 to insure step usage by a ladder user along the central portion thereof to inhibit tipping. And, in FIGS. 6 and 16 it can be seen that each upper side leg 13" of cross-brace 13 which serves as a step has increased structural support strength from front to rear to resist downward deflection of the rear portion under force placed thereon. This is accomplished through an upper under-support leg 18 extending outwardly from base leg 13' with spaced tapered intermediate truss members 19 extending transversely between upper side leg 13" and undersupport leg 18.

Referring to FIGS. 2, 3, 5, 6 and 8, it can be seen that front ladder section 3 is provided with sets of spaced, apertured leaf members 21 extending inwardly from front to rear of section 3 along the upper cross-brace 13. In like fashion and referring to FIGS. 1, 2, 3 and 10–15, it can be seen that rear ladder section 4 is provided with sets of spaced, apertured leaf members 22 extending inwardly from front to rear of section 4 along the upper cross-brace 14. These leafsets 21 and 22 serve as trusses for the upper cross-braces 13 and 14 and the sets are laterally offset relative one another to permit dovetailing of their opposed apertured extensions to form an upper hinge for the front and rear sections 3 and 4 when a suitable hinge pin 23 is inserted therethrough with the upper side legs 13" and 14" serving as spaced top ladder platforms. The laterally offset leaves further permit assembly of one type of the sections such as front step section 3, for both front and rear of ladder assembly. It is to be understood that in addition to leaf member sets 21 and 22, further suitable structural truss members can be provided between the side legs of each of the cross-braces 13 and 14 as might be needed. Although several such additional structural truss members are shown in several figures of the drawings, details of these additional truss members are not described herein.

Figure 6:
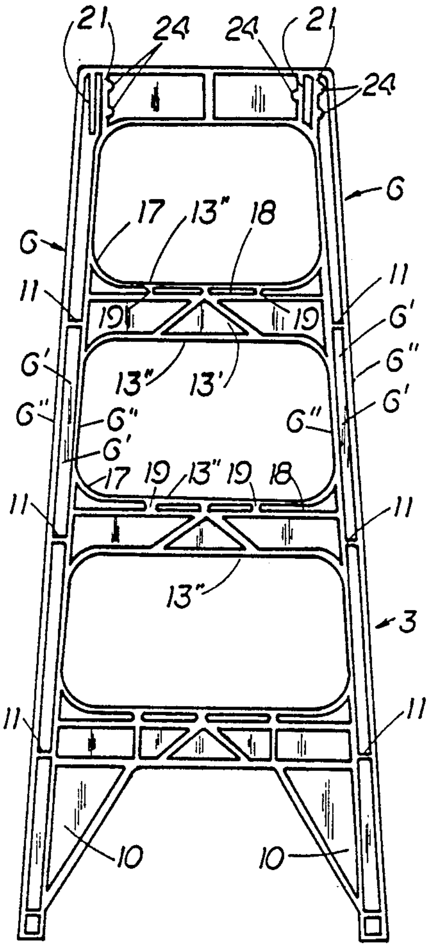
FIG. 6 is an inside or rear elevational view of the front section of the foldable ladder.
Figure 8:
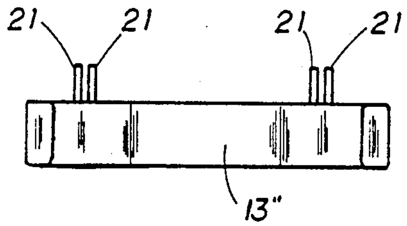
FIG. 8 is a bottom plan view of the front section of the foldable ladder.
Figure 7:
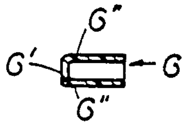
FIG. 7 is an enlarged cross-sectional view taken through line 7—7 of FIG. 5.
Figure 9:
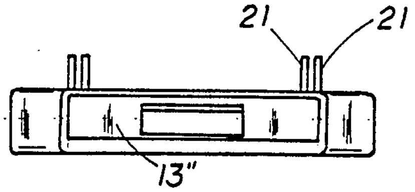
FIG. 9 is a top plan view of the front section of the foldable ladder.
Figure 10:
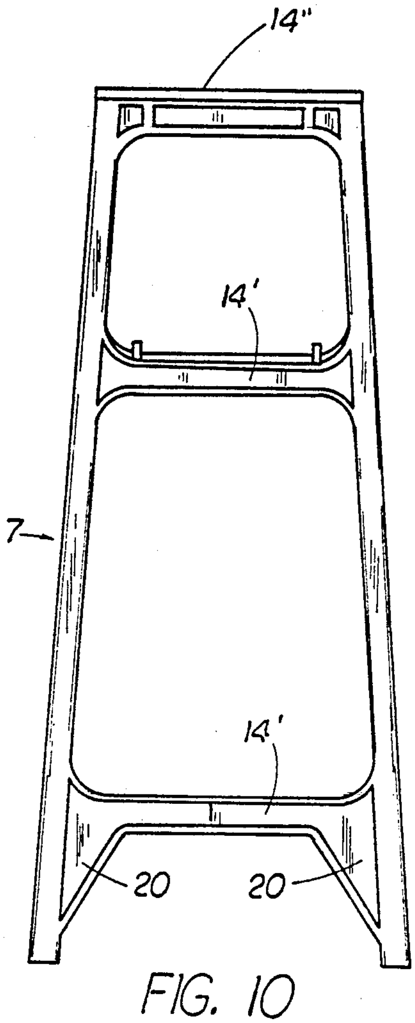
FIG. 10 is an outside or front elevational view of the rear section of the foldable ladder.

Referring to the top portion of front ladder section 3 in FIG. 6 of the drawings, it is to be noted that certain of the spaced leaves of set 21 are provided with raised ribs 24 along the sides thereof. Ribs 24 are spaced and positioned to serve as stops for the leading edges of the set of dovetailing leaves 24 to assure that in hinge assembly of ladder sections 3 and 4, the dovetailing sets of leaves have their apertures appropriately aligned for expedient insertion of hinge pin 23.

Figure 19:
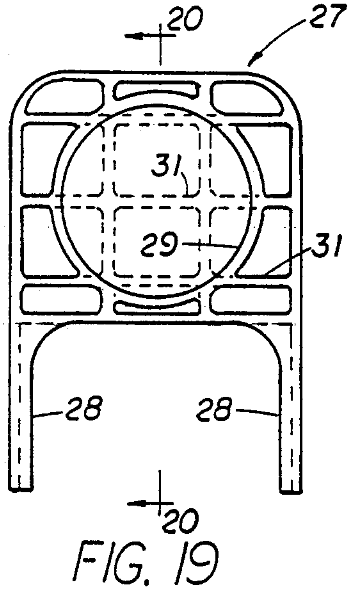
FIG. 19 is an enlarged top plan view of the shelf section disclosed in FIGS. 1-3.
Figure 20:
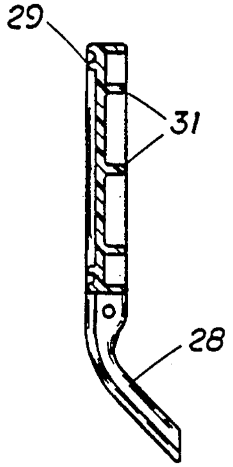
FIG. 20 is a cross-sectional view of the shelf section taken in a plane through line 20—20 of FIG. 19.
Figure 12:
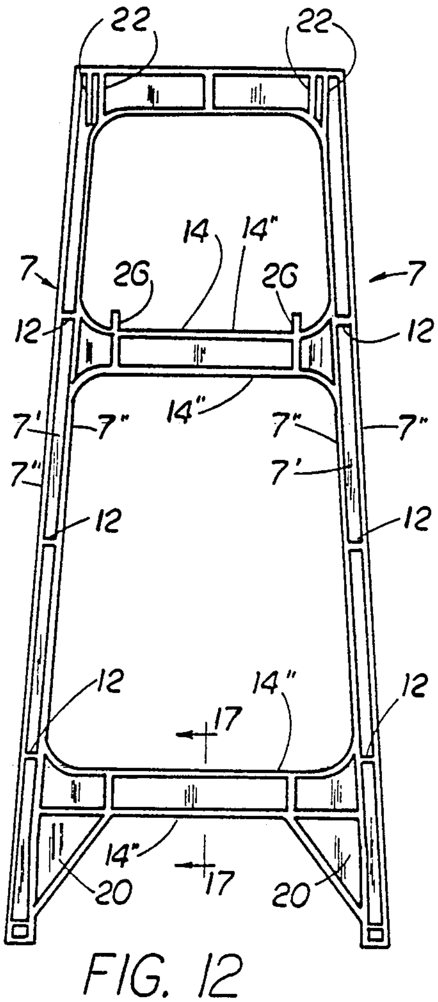
FIG. 12 is an inside or rear elevational view of the rear section of the foldable ladder.
Figure 14:
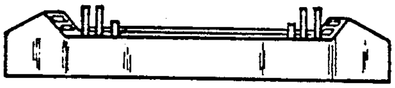
FIG. 14 is a top plan view of the rear section of the foldable ladder.
Figure 13:
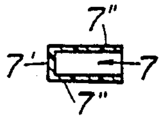
FIG. 13 is a cross-sectional view taken through line 13—13 of FIG. 11.
Figure 15:
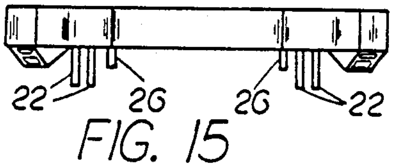
FIG. 15 is a bottom plan view of the rear section of the foldable ladder.

Referring to FIG. 12 of the drawings, it can be seen that the intermediate cross-brace member 14, has its trusses between spaced side legs 14"-14" extended to provide spaced apertured cantilevered support leaves 26. These support leaves 26 serve to pivotally support shelf member 27 which can be manually extended in erected horizontal support position when front and rear ladder sections 3 and 4 respectively have been moved from collapsed to erected position with their upper portions in proximal relation and their lower portions in distal relation. Shelf member 27, as disclosed in FIGS. 19 and 20, includes means cooperable with one of the ladder sections to pivotally collapse the shelf when front and rear ladder sections 3 and 4 are pivoted to collapsed position. This is accomplished by means of a pair of spaced curved arm members 28 integrally extending from the main body of shelf 27. When the shelf 27 is properly assembled to pivot on cantilevered leaves 26 of cross-brace 14, the arms 28, which are of appropriate length and appropriately curved, abut an edge of an opposed cross-brace 13 in the front ladder section 3 to be pivotally cammed to collapsed position within front section 3 and rear section 4 when these sections are moved to collapsed position (FIG. 3). It is to be noted in FIG. 19 that shelf 27 is provided with a circular raised rib 29 on its upper surface to receive a material container (not shown) and inhibit its lateral movement on the shelf top. Shelf 27 is further provided on both upper and lower surfaces with a series of spaced and crossed truss ribs 31 to increase the support strength and stability of the shelf.

Figure 18:
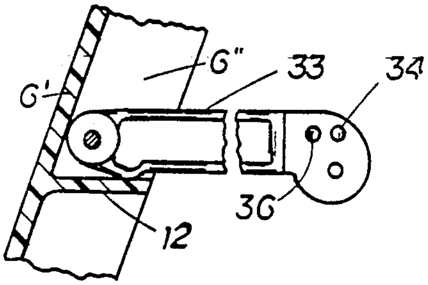
FIG. 18 is an enlarged broken away segmental view of portions of a link arm of a spreader assembly and a portion of a U-shaped side member of a ladder, disclosing one end of the link arm in abutting engagement with a truss which extends transverse the legs of the side member (see FIG. 6) and the opposite end of the link arm with the detent and recess thereon.

To limit outward pivotal movement of front and rear ladder sections 3 and 4, a collapsible spreader assembly 32 (FIGS. 1 and 2) is interposed between the pivotally hinged sections in spaced relation from the top platform sections with the extremities of the assembly connected to each of the sections. Assembly 32 includes spaced sets of link arm pairs, the link arms 33 of each pair are pivotally connected together in end-to-end relation with the opposite ends of the connected pairs nesting in the open ends of opposed U-shaped side members 6 and 7 of opposed pivotally hinged, ladder sections 3 and 4 which face each other. Each of such opposed nesting ends are pivotally mounted between the opposed longitudinally extending side legs 6" and 7" of the opposed side members 6 and 7 immediately above one of the trusses of truss sets 11 and 12. As can be seen in FIG. 18, each link arm 33 is so positioned relative the adjacent truss to abut and be stopped by the same when the link arm is pivoted to spread position. As can also be seen in FIG. 18, the inner face at the opposite extremity of each link arm 33 is provided with a raised detent 34 and a recess 36, the detent and recess being alternatively positioned on facing arm extremities to interlock and further restrain the pivoted link arms when in extended position.

It is to be understood that suitable treads or shoes (not shown) can be fastened to the bottoms of front ladder section 3 and rear ladder section 4, side members 6 and 7 respectively to prevent the ladder assembly from slipping. Further, although not shown, it would be possible to provide suitable linkage with ladder structure 2 to automatically move shelf 27 to a horizontal support position when front and rear ladder sections 3 and 4 are pivoted to erected position.

Figure 21:
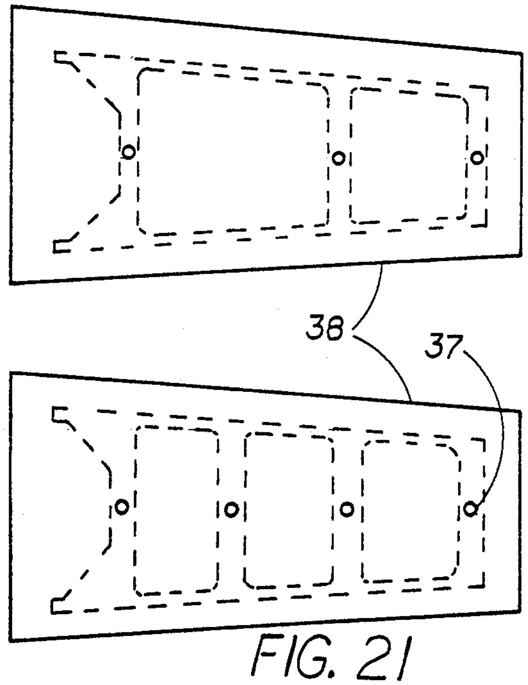
FIG. 21 is a schematic plan view of bottom portions of mold members which can be utilized to carry out the inventive method of forming front and rear ladder sections; and, FIG. 22 is a schematic side view of one of such mold members with a nozzle set associated therewith.
Figure 22:
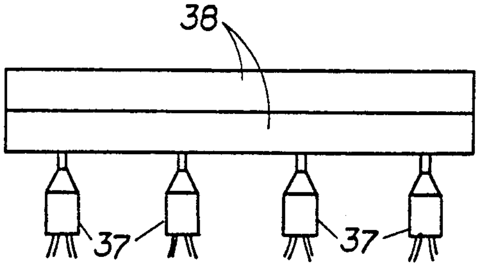

Referring to FIGS. 21 and 22 of the drawings, these figures schematically disclose mold apparatus for carrying out the steps of a novel method of manufacturing the unique apparatus described. In accordance with this novel method, controlled quantities of a suitable thermoplastic or possibly even a suitable thermosetting plastic compound which, when at an appropriate temperature for the particular plastic compound selected has a liquid or flowable form can be introduced in unexpanded form by injection through the nozzles of spaced plastic storage containers 37 at preselected spaced stations along several mating pairs of first and second mold parts 38, these mold parts being shaped and appropriately dovetailed in spaced relation to define first and second ladder sections of the shape of front and rear ladder sections 3 and 4 including the U-shaped side and cross-brace channel members and the hinge leaf sets and cantilevered leaf members as above described. In carrying out the inventive process, the mating pairs of molds would further include (not shown) a mold pair which defines a shelf section with cantilevered integral curved arms extending therefrom, another two of which define link arms having apertures, recesses and detents as above-described and, if desired, mold pairs defining male and female rivet parts such as can be seen in U.S. Pat. No. 3,208,331, issued to H. 0. Scholl on Sept. 28, 1965. Once appropriate quantities of expansible plastic material have been introduced into the several pairs of mold parts, the injected plastic compounds are expanded to their respective limits of confinement. After the expanded compounds have been allowed to set, the finished sections can be released from their respective mold pairs and the several finished parts can be assembled into a compact, foldable plastic ladder as above-described.

It is to be understood that although plastic rivets can be utilized as pivot members for the dovetailed hinges, the shelf and the link-arm spreader mechanism to avoid any possible electrical conductivity, it also would be possible to utilize suitable low electrically conductive metallic materials in such pivot places since they would be electrically insulated by the surrounding plastic parts which are assembled together. It also is to be understood that any one of a number of known plastic materials can be satisfactorily used to form the several parts above-described. Advantageously the material should be a thermoplastic one capable of softening and expanding at preselected temperatures to permit changes in shape and capable of hardening in such changed shape to maintain such shape at expected ambient temperatures.

The invention claimed is:

1. A method of forming opposed ladder sections for foldable ladder structure, said sections to be joinably hinged below the top platform of said ladder structure, comprising the steps of:

forming each of said sections to include a portion of said top platform and a portion of a hinge therebelow with the hinge portion of each of said sections being formed to be in lateral offset relation to the hinge portion of the other section and with at least one section including formed spaced steps therein by supplying a controlled quantity of expansible plastic compound in unexpanded form solely along a partially confined first mold part of a mold pair, said first mold part of said pair having a preselected shape in accordance with the ladder section to be formed, said first mold part of said mold pair and only said expansible compound being confined with an opposing second and mating mold part of said pair of preselected shape to provide a completely confined mold cavity of fixed shape in accordance with the ladder section to be formed;

expanding said compound in the formation of each ladder section to the limits of complete confinement of said mold cavity of fixed shape formed by said mating pair of mold parts for each ladder section;

releasing each of said mating mold parts forming each of the finished ladder sections from mold confinement after said expanded plastic compound has set;

assembling said sections with the offset hinge portion of one ladder section dovetailing with the offset hinge portion of the other section and with the top platform portion of each section being aligned to form a top platform when in ladder open position;

connecting said dovetailing hinge portions of each section together for pivotal movement of said ladder sections about said connected hinge portions to ladder open and ladder closed positions; and linking said opposed ladder sections with said connected dovetailing hinge portions with pivotal link arms below said hinges to allow said hinge portions connected ladder sections to be moved with respect to each other between a limited ladder open and a ladder closed position.

2. The method of forming ladder sections of claim 1, said controlled quantity of plastic being injected under pressure to said mold cavities for each ladder section at preselected spaced stations along the mold.

3. The method of forming ladder sections of claim 1, said plastic compound being thermoplastic.

4. The method of forming ladder sections of claim 1, said ladder sections being selectively tapered to allow quick, uniform mold release.

5. The method of claim 1, and forming a shelf section for said opposed ladder sections by injecting a similar expansible plastic compound in a similar fashion into mating mold parts in the shape of a shelf section having integral arms extending therefrom in cantilever fashion;

releasing said shelf section from said mating molded parts;

assembling said released molded shelf section cantilevering arms to one of said ladder sections for pivotal movement relative thereto during ladder open and ladder closed position.

6. The method of claim 1, and forming said pivotal link arms for said opposed ladder sections by injecting in a similar expansible compound in a similar fashion into mating mold parts in the shape of link arms having apertures at opposite extremities for pivotal pin connection to each other and to said ladder sections;

releasing said link arms; and assembling said link arms with one end of each respectively connected to a ladder section and opposite adjacent ends pivotally connected to each other.

7. The method of claim 1, said mold parts for said ladder sections being shaped to include ribs, truss and brace structure at preselected locations for the ladder section being formed.

* * * * *